United States Patent Office 2,959,930
Patented Nov. 15, 1960

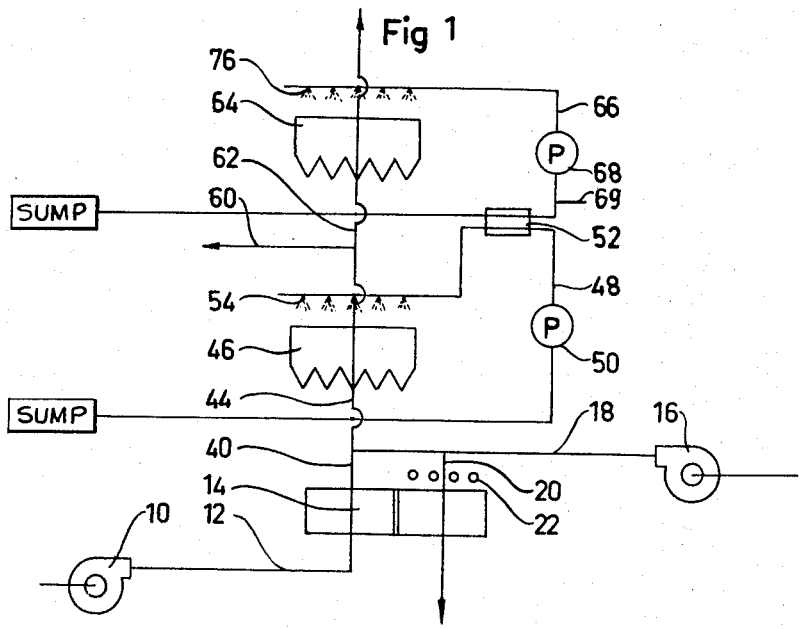
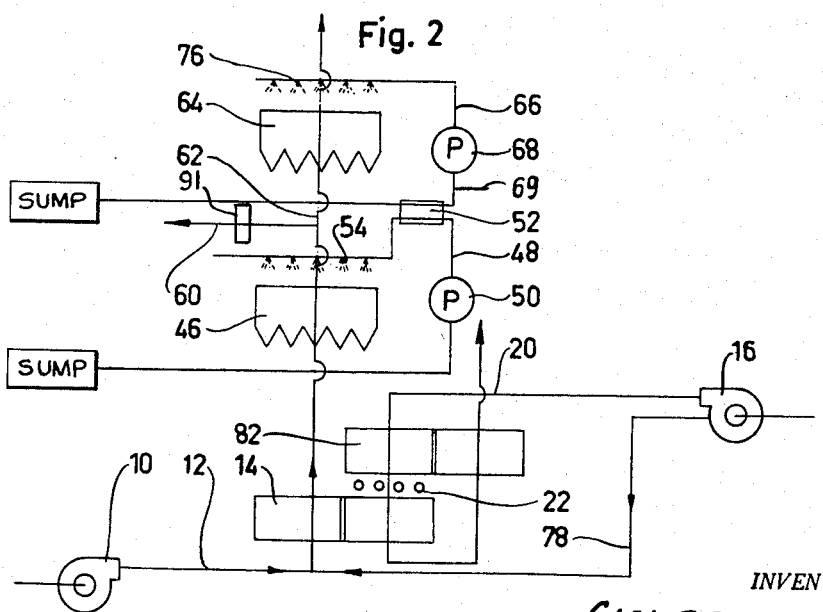

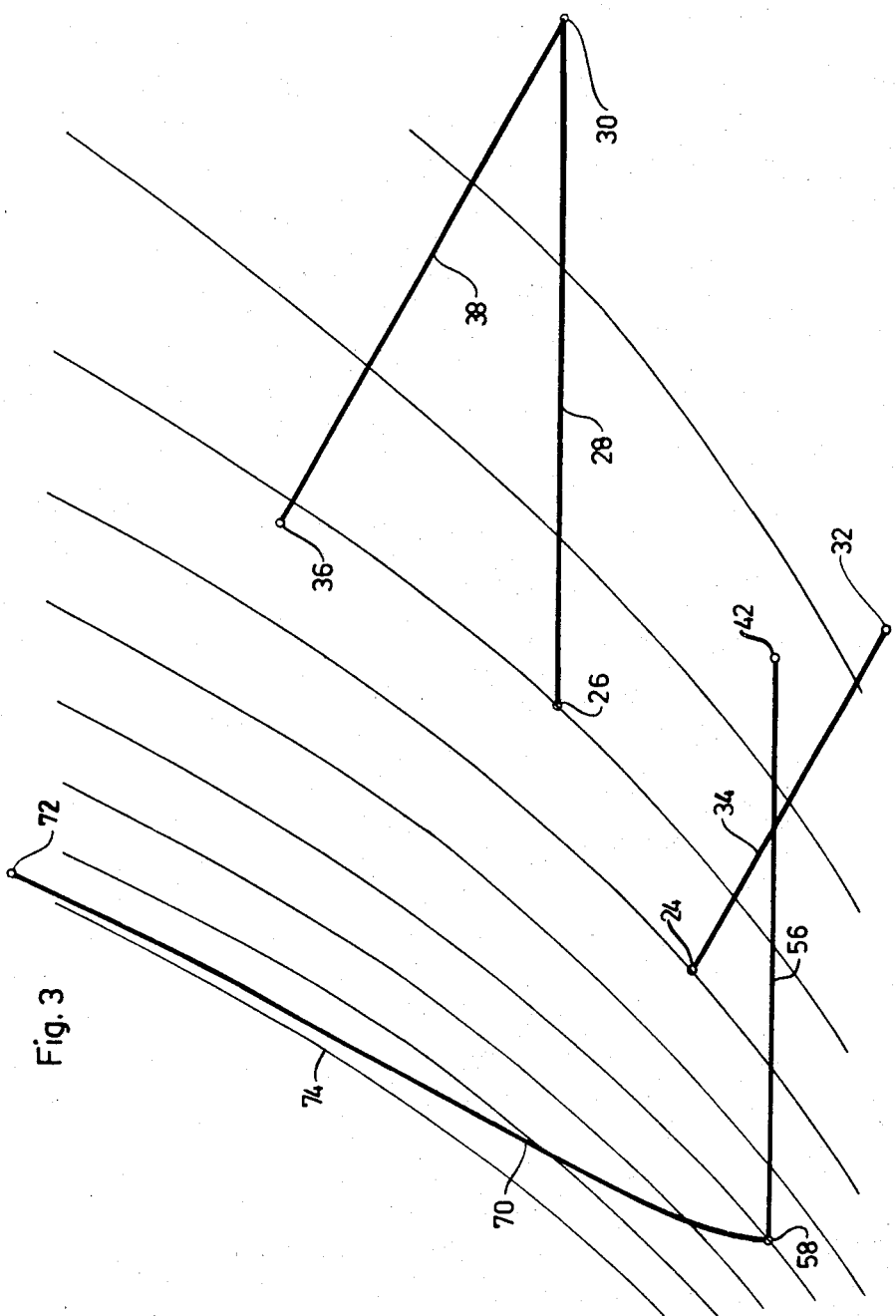

2,959,930

AIR CONDITIONING SYSTEMS

Carl Georg Munters, Danderydsvagen 3, Danderyd, Stockholm, Sweden

Filed Oct. 23, 1956, Ser. No. 617,840

5 Claims. (Cl. 62—93)

The present invention relates to improvements in air conditioning systems and more particularly to a method and apparatus for conditioning the room air or exhaust air by thermodynamic exchange with outdoor air by which the induction air is cooled by non-hygroscopic contact with a liquid which in turn has been cooled directly or indirectly by evaporation thereof in a stream of outdoor air.

The principal object of the invention is to effect air conditioning with substantial economy of power consumption; to economize on the amount of energy required for the dehumidification and cooling of the induction air and to increase the coefficient of performance.

Another object of the invention is to cool the liquid for the actuation of the sensible cooler in a separate cooling tower or evaporative pad of simplified construction, thus minimizing the problem of clogging and insuring continuous and efficient operation.

A further object is to provide an installation in which the dehumidification means can also be used for heating and humidifying where conditions so require, for instance in winter time.

A still further object is to provide an installation that can be operated by a relatively economical source of heat, such as gas, oil, and steam.

The invention contemplates in terms of broad inclusion the combination of one or more transferrers for exchanging thermodynamic characteristics between the exhaust air and outdoor air, with a cooler in which the sensible heat is removed from the induction air and a cooling tower in which the liquid for actuating the sensible cooler is being continually cooled by evaporation. The combination may also include a heating element for regenerating the transferrer and an evaporative pad for further cooling the induction air.

The invention also contemplates the use of a transferrer which moves cyclically across the passages for the exhaust air and the outdoor air respectively. An example of such transferrer is shown in United States Patents Nos. 2,700,537 and 2,723,837 and in applicant's co-pending application Serial No. 442,686, now abandoned.

The sensible cooler as well as the cooling tower may embody the structure shown in applicant's co-pending applications Serial Nos. 442,688, now Patent No. 2,809,817 and 592,786, now Patent No. 2,809,818.

The foregoing description is given in general terms and the arrangement and detailed construction of the component parts may be subject to a variety of modifications.

The invention together with the objects and advantages inherent therein will be more readily understood from the following description and accompanying drawings in which:

Figure 1 is a schematic view of an installation according to the invention.

Figure 2 is a schematic view of an installation of a modification.

Figures 3 and 4 are charts which show the psychrometric interaction of the air streams as they pass through the installation shown schematically in Figures 1 and 2 respectively.

Figure 4:
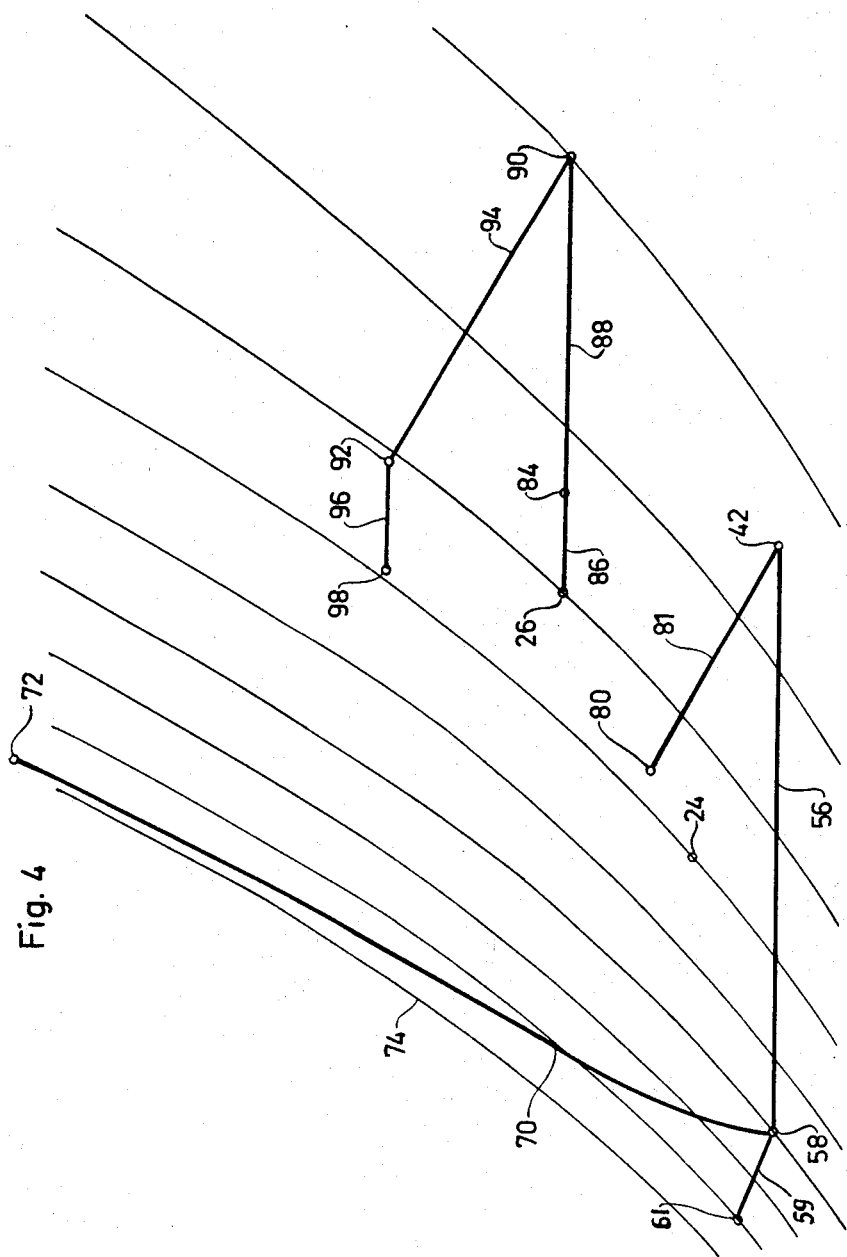

Referring to Figure 1, the reference character 10 designates a fan which impels air from the enclosure, which is to be conditioned, through the passage 12 to a moisture transferrer 14. Another fan 16 impels outdoor air through the passage 18 and through a branch passage 20 to the moisture transferrer 14. A heating element 22 may be provided for the purpose of regenerating the moisture transferrer. The heating element may also serve as a furnace for use of the installation for heating in cold weather.

The moisture transferrer dehumidifies the air leaving the enclosure by thermodynamic exchange with heated outdoor air. The transferrer should preferably embody such construction that it transfers principally moisture and appreciably little sensible heat. It may with advantage embody the construction shown in co-pending applications Serial Nos. 485,632, now Patent No. 2,925,880, 442,686, now abandoned and 442,687. The feature common to this type of exchanger is that they are of the regenerative type and comprise a transferrer body which moves cyclically across the passages for the respective air streams.

The moisture transferring mass may take the form of thin threads, partitions or foils which offer less resistance to the air flow than a mass of comminuted material such as beds of silica gel, charcoal calcium chloride, etc. Furthermore, while a continuously moving transfer element is preferable, intermittently or alternately moving transferrers may be used so that one is used to remove moisture while the other is regenerated.

For the purpose of the following description, let us assume that the air leaving the enclosure has the psychrometric condition corresponding to point 24 on Figure 3 and which is roughly 80° F. and 50% relative humidity. For the same purpose let us assume that the outdoor air has the psychrometric condition corresponding to point 26 which is roughly 95° F. and 40% relative humidity. The outdoor air is heated by the heating element 22 which is reflected upon the chart in Figure 3 by the line 28 running parallel with the abscissa and indicates sensible heating only. The outdoor air upon entry into the moisture transferrer has acquired the psychrometric condition 30 which corresponds roughly to 132° F. and 14% relative humidity. In the moisture transferrer 14, the leaving air or exhaust air is dehumidified along the enthalpy line 34 to the point 32 which corresponds roughly to a temperature of 98° F. and a relative humidity of 17%. Simultaneously the outdoor air is humidified along the enthalpy line 38 to the point 36 which corresponds roughly to a temperature of 105° F. and a relative humidity of 42%. It should be noted that the point 36 represents a lower relative humidity than point 24 and point 30 a lower relative humidity than point 32 which is necessary in order to provide the power.

For the sake of simplicity it is assumed that the moisture transferrer is 100% effective, i.e., transfers moisture only. Then the lines 34 and 38 will follow the enthalpy lines. In actual practice the moisture transfer will, of course, be accompanied by some sensible heat transfer and consequently the lines 34 and 38 would then extend at an angle to the enthalpy lines, and the points 32 and 30 would be displaced towards the right on the chart.

The volume of outdoor air is preferably less than the volume of exhaust air passing through the transferrer which is indicated on the chart by the fact that the line 38 is longer than the line 34. If we assume that the volume of indoor air is 100%, then in the example shown in the diagram, the outdoor air is 75%.

The dehumidified exhaust air leaving the moisture transferrer 14 through the passage 40 is mixed with a smaller volume of outdoor air impelled by the fan 16. In the example shown, the proportions are assumed to be 2:1. Therefore, if the indoor air, as above, is 100%, the portion of outdoor air is 50%. Consequently, there is now an air volume which is 150% of the room air. Let us now assume that the exhaust air after having passed through the moisture transferrer 14 has the psychrometric condition represented by the point 32 and the outdoor a condition represented by the point 32 in Figure 3. The induction air if mixed in the proportions mentioned will then have a psychrometric condition represented by the point 42 which corresponds roughly to a temperature of 96° F. and a relative humidity of 25%.

The mixed air is then conducted to the sensible cooling element 46 through the passage 44. The cooling element may with advantage be of the type in which the air is cooled by contact with a liquid. Preferably it may be of the type shown in my co-pending application Ser. No. 442,688, filed July 12, 1954, and Ser. No. 592,786, filed June 21, 1956, to which reference is made for a detailed description. The liquid should be nonhygroscopic and may consist of a silica solution or an odorless oil, so that the mixed air will not pick up moisture during the contact. It should, of course, be understood that a variety of other types of sensible coolers may be used without departing from the scope of the invention. Thus, a sensible cooler, comprising separate ducts for the liquid and the air, may be used.

The cooling liquid is circulated in a closed circuit 48 by the aid of a pump 50. The heat exchanger 52 is also included in this closed circuit. The sensible cooler 46 is also provided with a sprayer device 54 which uniformly distributes the liquid over the cooling element so that it will run down the walls of its numerous ducts. During the downward flow of the liquid through the ducts, it is connected by the countercurrently flowing air mixture which is thereby cooled. The sensible cooling is reflected in the diagram by the line 56 and the air will be assumed to have acquired a psychrometric condition corresponding to the point 58 which is roughly 65° F. and 70% relative humidity. After the mixture of air has passed through the cooler 46, the air stream is again divided into two portions. The greater portion which, in the present case, is two-thirds of the total volume is conducted back to the room through the passage 60 while one-third of the air is conducted through the passage 62 to an evaporative cooler or cooling tower 64. It will be understood, therefore, if the volume of air leaving the room is assumed to be 100%, then the volume of return air or induction air let back into the room through the passage 60 will also be 100% as 50% of the air volume is conducted to the evaporative cooler 64.

The object of the cooling tower 64 is to cool the liquid which is used for actuating the sensible cooler 46 and a heat exchanger is therefore included in the liquid circuit 66 in which is also provided a pump 68 to which the heat exchanger 52 is connected. Fresh liquid is provided through the conduit 69 to replace the liquid evaporated in the cooling tower. In the heat exchanger 52, which may be of conventional countercurrent type with concentric ducts, an exchange of heat takes place between two liquids. The cooling tower 64 is preferably of the same type as the sensible cooler 46 and may embody the construction described in the aforementioned co-pending patent applications. In this case the liquid is water which is evaporated into the treated air stream. The psychrometric change of the air follows substantially the curve 70 in Figure 3 until it reaches the point 72 which corresponds to a temperature of roughly 86° F. and which lies adjacent to or immediately below the saturation curve 74. The sensible heat which is removed from the induction air in the cooling element 46 is represented by the distance between the points 42 and 58. Thus, the portion of air passing through the cooling tower 64 should be able to take up an amount of heat from the water circulated in the circuit 66 which is equal to the heat removed in the sensible cooling step. In this connection it should be borne in mind that the volume of air passing through the cooling tower 64 is only one-third of that passing through the sensible cooler 46. By reason of the dehumidification of the exhaust air in the moisture transferrer 14 and the resulting low humidity of the air mixture passing through the cooling tower 64, the thus treated air in the latter acquires a capacity to increase its heat content per unit of weight to the necessary degree, i.e., three times the reduction of heat content per unit of weight which takes place in the cooler 46. In the cooling tower 64 the air is successively heated resulting in an increased capacity to evaporate water which explains the great increase in enthalpy. A spraying device 76 is arranged above the cooling tower 64 for the purpose of uniformly distributing the liquid through the several ducts of the cooling tower. Assume now that the water distributed through the sprayer device 76 has a temperature of roughly 92° F. and is cooled to a final temperature of roughly 60° F. In the heat exchanger 52 the non-hygroscopic liquid for actuating the cooler 46 is cooled to about 61° F. and the cooling tower liquid is heated to about 95° F. The heat content which is represented by the distance between the enthalpy lines through the points 58 and 72 has been removed from the water in the cooling circuit 66 which in turn cools the non-hygroscopic liquid in the circuit 48. Thus a portion of a cooled induction air is sacrificed in order to effectuate this cooling.

The change in psychrometric condition between the respective liquids, whether such change is in heat or in moisture, is always based upon the principle of countercurrent flow. This contemplates a change in one of the liquids which corresponds substantially to the starting condition of the other liquid and vice versa. If the auxiliary media circulated in the circuit 48 is disregarded, it will be seen that even the air streams in the elements 46 and 64 exchange heat in accordance with this principle. What is of equal importance is the fact that the heat exchange takes place continuously or in one single step so that the mixed induction air is successively cooled in the element 46 while the water is similarly successively cooled in the cooling tower 64. As a result the line 70 will show the continuously rising curve on the point 58 to the point 72. This insures a very high efficiency in the apparatus.

In accordance with the above described concept, the volume of air which the fan 16 is required to impel will be 125%. The coefficient of performance in the system, i.e., the proportion between the amount of heat which the treated air picks up from the enclosure and the amount of heat which is supplied by the heating element 22 has been found to be as high as 0.85.

The modification shown in Figure 2 with the appurtenant diagram shown in Figure 4 has an even higher coefficient of performance. The air exhausted from the enclosure by the fan 10 through the conduit 12 in this case is mixed with outdoor air before it is passed through the moisture transferrer 14. The outdoor air is impelled by the fan 16 through the passage 78. If it is assumed that the room air is 100%, the outdoor air may be much less and is preferably 50%, that is one-half of the volume of room air. The room air as in the previous case is assumed to have a psychrometric condition represented by the point 24 which corresponds roughly to a temperature of 80° F. and a relative humidity of 50% and the outdoor air is assumed to have the psychrometric condition represented by the point 26 which corresponds to a temperature of about 95° F. and 40% relative humidity. With the mentioned proportions of room air and outdoor air, the mixture will acquire a psychrometric condition represented by the point 80 which corresponds to about 85° F. and 47% relative humidity. This point lies on a straight line between the points 24 and 26 and the distance between the points 24 and 80 is one-third of the distance between the points 24 and 26.

Another portion of outdoor air is conducted through the passage 20 through the moisture transferrer 14 and the volume of this portion of outdoor air is less than the volume of the mixed air and which in this case is 100% or in other words of the same volume as the room air. Before entry into the moisture transferrer this portion of outdoor air passes through a heat exchanger 82 and a heating element 22. In the heat exchanger this portion of outdoor air is heated by exchange of the outgoing portion of the same stream. In other words, the incoming outdoor air is heated against the cooling of the outgoing stream of the same air and which represents a considerable saving of power and fuel consumption. In the diagram shown in Figure 4, the outdoor air passed through the heat exchanger 82 is assumed to have acquired an increase in temperature to the point 84 corresponding to about 104° F. and a relative humidity of about 33%. Now, if the increase is exclusively in the sensible heat, it will be represented by a line 66 which is parallel to the abscissa of the diagram. This portion of outdoor air is further heated by the heating element along the line 88 to the point 90 which corresponds roughly to a temperature of 119° F. and a relative humidity of 20% and which represents the psychrometric condition of this portion of the outdoor air upon entry into the moisture transferrer 14. The simultaneously passing mixture of room air and outdoor air in thermodynamic exchange with the first mentioned portion of outdoor air is dehumidified to a psychrometric condition represented by the point 42 which corresponds roughly to a temperature of 95° F. and a relative humidity of 25%. The thermodynamic changes taking place in the cooling element 46 and the cooling tower 64 are the same as those described in connection with Figures 1 and 3. In this case, as in the previous example, an evaporative pad 91 may be provided in the passage 60 which imparts a still lower temperature to the incoming air at the same time that it increases the moisture content. This evaporative cooling of the induction air is shown by the line 59 in the diagram and Figure 4 which approximately follows the enthalpy line passing through the point 58. The induction air returned to the room will then have a psychrometric condition represented by the point 61 which corresponds to a temperature of about 51° F. and 90% relative humidity. The portion of the mixed treated air which is used to evaporate water in the cooling tower 64 is returned to the atmosphere and has a psychrometric condition represented by the point 22 and which corresponds to about 86° F. and a relative humidity of about 95–100%.

The moisture content of the portion of outdoor air which is used to regenerate moisture transferrer 14 is increased so that it will have acquired a psychrometric condition represented by the point 92 upon its exit from the moisture transferrer. The latter condition corresponds roughly to a temperature of 102° F. and a relative humidity of about 41%. The change is assumed to follow an enthalpy line 94 between the points 90 and 92, but in reality will deviate slightly from the enthalpy line as explained herein. The line 94 is longer than the line 81 and the same proportion of volume of outdoor air which passes through the moisture transferrer is less than the volume of the mixed induction air. As illustrated by the point 92, the outdoor air has a certain excess temperature with respect to the final exit temperature and this excess in temperature is used in the heat exchanger 82 in order to preheat the air along the line 86. The leaving outdoor air, on the other hand, is reduced in temperature along the line 96 and will acquire the psychrometric condition represented by the point 98 and which corresponds to a temperature of about 64° F. and a relative humidity of about 49%. This preheating of the outdoor air by exchange with the outgoing portion of the same stream represents a substantial saving in power and fuel consumption, and it has been found that in this case the coefficient of performance will go to as high a figure as 1.1.

The heat exchanger 82 may be composed of fine threads or foils which latter form thin partitions or of a corrugated sheet material forming a cellular structure. The heat exchanger may be with advantage of the type described in co-pending U.S. patent applications Ser. Nos. 442,686, filed July 12, 1954, and 387,656, filed October 22, 1953, now abandoned, and are of a so-called regenerative type, i.e, an exchanger wherein one fluid passes in contact with the surface of the substance and gives off heat to the same, whereafter another fluid passes into contact with the same surface and is heated. The heating element 22 is preferably a gas heater of the type shown in Pennington Patent No. 2,700,537, but may, of course, consist of an electrically heated grill, an oil burning furnace or any equivalent heating means. The heating means may be augmented by radiation screens or shields, similar to those shown in the aforementioned Pennington patent, for the purpose of shielding the moisture and heat transferrer from direct rays from the heating means.

The driving mechanism and speed change mechanism for the heat transferrers may be similar or identical with that shown in Pennington Patent No. 2,700,537 and should not therefore require any detailed description.

The evaporative pad 91 may be of conventional construction, as indicated. Water may be fed to the evaporator from a tank by means of a conventional pump and the tank may be supplied with water from any convenient source. This mechanism may be similar or identical with that shown in the aforementioned Pennington Patents Nos. 2,700,537 and 2,723,837. An evaporative air cooler of the type shown in U.S. patent to McKinney and Pennington Patent No. 2,681,217 might also be used in place of the aforementioned pads.

The apparatus may also be controlled in a manner identical or similar to that shown in the aforementioned patents, thus thermostats and humidistats which actuate the electrical switches may be provided, as shown in these patents, to control the turning on and turning off of the pumps and the fuel valves.

It should also be pointed out that the evaporative pad 91 may be inserted in the passage 44 above the cooler 46 but before the juncture with the room passage 60. The cooling tower curve 70 will in that case start from the point 61 and will end at the same enthalpy line as the point 72.

It is also pointed out that the air passing through the cooling tower 64 may in certain cases consist exclusively of room air or exclusively of outdoor air, the total heat content of which has been previously reduced. Thus, addition of outdoor air to the room air circulated between the enclosure and the system may not be necessary under all conditions.

It should also be understood that the foregoing description was given by way of example only in the invention and may be subject to a variety of modifications within the scope of the accompanying claims.

What is claimed is:

1. The method of conditioning air for an enclosure which comprises removing sensible heat from a mixture of enclosure air and outdoor air by passing said mixture through a heat exchanger in non-hygroscopic contact with a cooled liquid, said mixture first having been dehumidified by moisture exchange with outdoor air, passing a portion of the cooled dehumidified air mixture through an evaporative cooler to cool a stream of liquid while passing the remainder of the cooled and dried air into the enclosure and utilizing the thus cooled liquid to effectuate the removal of sensible heat from the air mixture in the heat exchanger.

2. The method of conditioning air for an enclosure which comprises removing sensible heat from a mixture of enclosure air and outdoor air by passing said mixture through a heat exchanger in non-hygroscopic contact with a cooled liquid, said mixture first having been dehumidified by exchange with outdoor air, passing a portion of the cooled dehumidified air mixture through an evaporative cooler to cool a second stream of liquid while passing the remainder of the cooled and dried air into the enclosure and passing said cooled second stream of liquid through a second heat exchanger in non-hygroscopic contact with the first liquid stream whereby to cool the latter so as to effectuate the sensible heat removal in the first heat exchanger.

3. The method of conditioning air for an enclosure which comprises mixing air leaving the enclosure with a portion of outdoor air, dehumidifying said mixture by regenerative thermodynamic exchange with another portion of outdoor air, removing sensible heat from said mixture by passing said mixture through a heat exchanger in non-hygroscopic contact with a cool liquid, passing a portion of the cooled dehumidified air mixture through an evaporative cooler to cool a stream of liquid while passing the remainder of the cooled and dried air into the enclosure and utilizing the thus cooled liquid to effectuate the removal of sensible heat from the air mixture in the heat exchanger.

4. An air conditioning system comprising separate passage means for a stream of air to be conditioned and a stream of outdoor air, a moisture transferrer for regeneratively exchanging thermodynamic characteristics between said stream of air to be conditioned and outdoor air mounted to move cyclically across said passage means, means for impelling the respective air streams through said moisture transferrer, means for removing sensible heat from the air to be conditioned by non-hygroscopic contact with a liquid, an evaporative cooler, means for passing liquid through said cooler, passage means for delivering a portion of the treated air into a room to be conditioned, passage means for delivering another portion of the treated air through said evaporative cooler to cool the liquid, and said means for removing sensible heat exchanging heat from the air to be conditioned to the cooled liquid from the evaporative cooler.

5. An air conditioning system according to claim 4 having means for passing a portion of outdoor air into the stream of air to be conditioned prior to the removal of sensible heat therefrom.

References Cited in the file of this patent

UNITED STATES PATENTS

| | | |
|---|---|---|
| 2,064,808 | Beran | Dec. 22, 1936 |
| 2,069,359 | Dudley | Feb. 2, 1937 |
| 2,197,203 | Buffington | Apr. 16, 1940 |
| 2,200,243 | Newton et al. | May 14, 1940 |
| 2,266,219 | Larriva | Dec. 16, 1941 |